May 25, 1948.  J. D. FLORIA  2,442,288

STEERING MECHANISM

Filed March 6, 1946  2 Sheets-Sheet 1

Inventor
James D. Floria
By Ira Milton Jones
Attorney

May 25, 1948.　　　　J. D. FLORIA　　　　2,442,288
STEERING MECHANISM
Filed March 6, 1946　　　　2 Sheets-Sheet 2
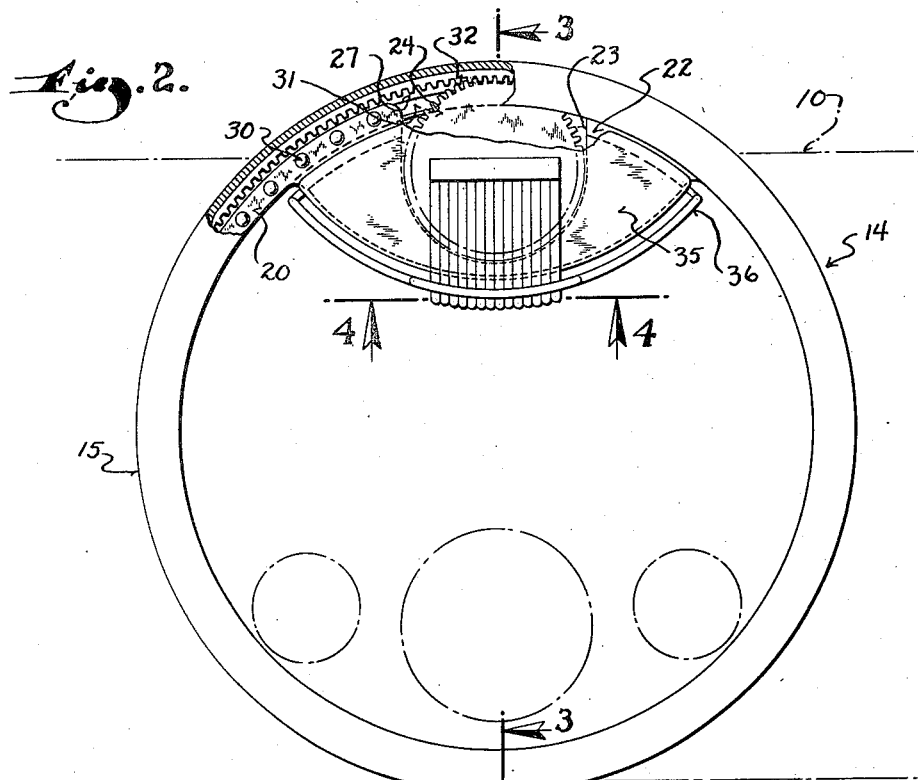
Inventor
James D. Floria Patented May 25, 1948

2,442,288

UNITED STATES PATENT OFFICE 2,442,288

STEERING MECHANISM

James D. Floria, Milwaukee, Wis.

Application March 6, 1946, Serial No. 652,306

11 Claims. (Cl. 180—90)

This invention relates to steering apparatus for automobiles and other conveyances, and refers more particularly to improvements in steering wheels and the manner in which the same are rotatably mounted to control a steering shaft.

In automobile constructions presently employed the steering column projects rearwardly and upwardly through the dashboard into the forward end of the driving compartment which it enters at a point near the clutch and brake pedals to pass beneath the lower edge of the instrument panel and to project a substantial distance rearwardly of said panel. Hence, a considerable length of the steering column is actually located in the driving compartment between the instrument panel and the driver's seat. The steering wheel mounted on the upper extremity of the column has a hub connected with the steering shaft inside the column and a rim joined to the hub by spokes.

The present location of the steering wheel is not only inconvenient from the standpoint that its hub and spokes often interfere with clear vision of the instruments on the instrument panel, but the wheel and particularly the upper extremity of the steering column constitute a hazard to the driver in the event of collision.

This results from the fact that the upper extremity of the steering column is directly forward of the driver's vital chest area and many serious and even fatal injuries have been suffered by drivers thrown against the steering wheel by the force of a collision at which time the wheel itself usually gives way and leaves the upper extremity of the steering column or the hub of the wheel exposed as a substantially immovable object.

The principle object of the present invention is to provide an improved steering wheel construction which not only gives the driver a clear view of the instruments on the instrument panel, but which enables substantially complete elimination of the steering column from the driver's compartment.

More specifically, it is an object of the present invention to provide a spokeless steering wheel having an eccentric hub located directly adjacent to the rim of the wheel to enable the steering column to be relocated with its upper extremity fixed to and terminating at the instrument panel a substantial elevation above its lower edge.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 2 is an elevational view of the steering wheel of this invention substantially as it would appear to a driver of the automobile with the instrument panel indicated in construction lines behind the wheel to show its relationship thereto;

Figure 3 is a cross sectional view taken through Figure 2 on the plane of the line 3—3;

Figure 5 is an enlarged cross sectional view through a portion of the steering wheel rim illustrating the construction thereof.

Figure 1:
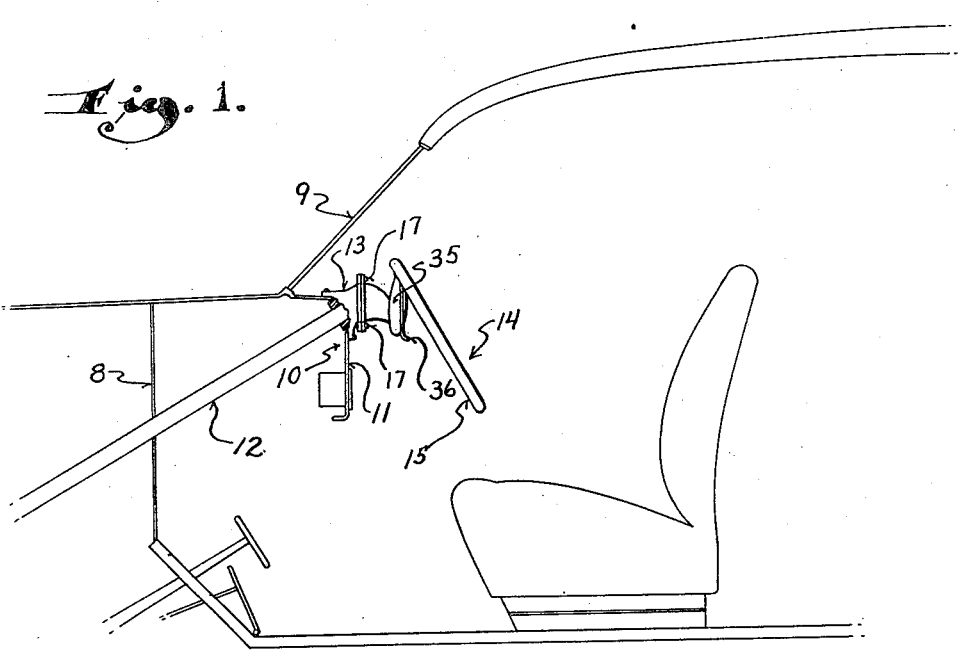
Figure 1 is a fragmentary longitudinal cross sectional view through an automobile illustrating the application of the improved steering gear of this invention thereto.
Figure 4:
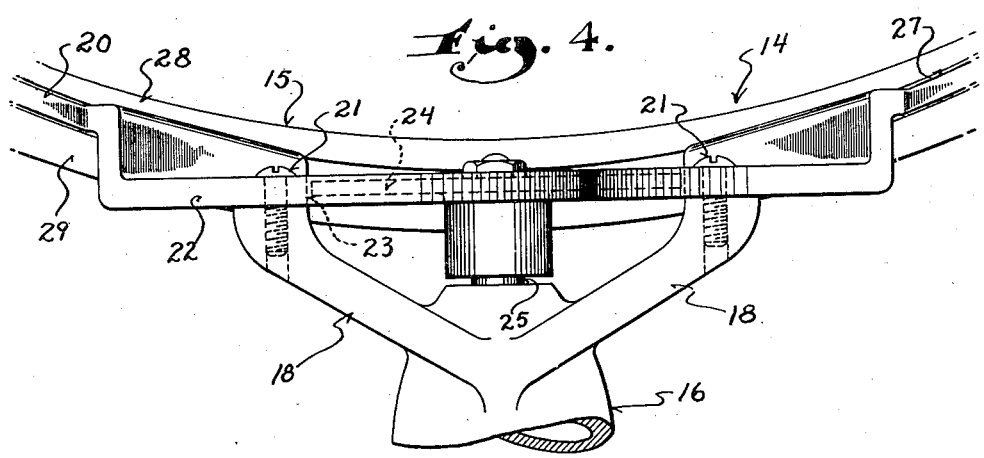
Figure 4 is a view taken along the line 4—4 of Figure 2 and illustrating the connection between the steering wheel and its eccentric hub.

Referring now more particularly to the accompanying drawings, Figure 1 illustrates the application of the steering mechanism 5 of this invention to an automobile 6 of a conventional type having a driver's compartment 7.

A dashboard 8 defines the forward limits of the driver's compartment, and as is customary is located a distance forwardly of the windshield 9. The usual instrument panel 10 is positioned behind the windshield and has an upright instrument supporting surface 11 extending downwardly with respect to the lower edge of the windshield.

As stated previously, it has been the custom in the past to extend the steering column upwardly and rearwardly through a slanted section at the bottom of the dashboard and under the bottom edge of the instrument supporting surface 11 a substantial distance beyond the instrument panel and into the driver's compartment to enable the usual steering wheel mounted thereon to be disposed in a convenient position to be grasped by the driver during operation of the vehicle.

The present invention eliminates the hazard resulting from such past positioning of the steering column, and the steering column 12 of this invention is relocated to pass rearwardly and upwardly through the space between the instrument panel and the upright section of the dashboard 8 with the column terminating at the instrument panel as shown substantially at the top of the instrument supporting surface 11. Any suitable means such as a connector 13 may be employed to anchor the upper extremity of the steering column to the top portion of the instrument panel.

The steering wheel of this invention, generally designated by the numeral 14, comprises a circular rim 15 and an eccentric hub 16 on which the rim is rotatably mounted. The hub is secured to the connector 13 as by means of bolts 17 passing through cooperating flanges on the hub and connector respectively, and holds the rim with its top portion substantially in line with the steering column and its major portion depending therefrom at a slight angle rearwardly toward the driver's seat.

In order to freely rotatably support the steering wheel the hub is provided with a pair of substantially diametrically opposite arms 18 which diverge outwardly from the hub as they approach the circle of the steering wheel rim. A substantially annular guide track 20 is secured to the arms 18 as by screws 21 passing through an arcuate cross member 22 on the guide track disposed substantially concentric to the axis of the hub with the hollow side thereof facing the rim to define a pocket 23 in the outer peripheral portion of the track.

The annular guide track 20 thus terminates adjacent to the extremities of the arcuate cross member as shown in Figure 2, and the pocket 23 in the periphery of the track accommodates a pinion 24 fixed on a stub shaft 25 rotatably journalled in the hub on a substantially horizontal axis as by a bearing 26. The outer toothed periphery of the pinion projects slightly from the pocket 23 and along with the guide track is received in an annular recess 27 in the rim opening to the inner periphery of the rim.

The rim is preferably comprised of two annular complementary members 28 and 29 which together define a substantially circular cross section. One of the members 28, however, is provided with an annular shoulder or bead 29' adjacent to its outer periphery to hold the adjacent sides of the members spaced apart to define the aforementiond recess 27.

The annular guide track 20 provides a carrier for a series of anti-friction elements in the form of ballbearings 30 arranged to ride in circular grooves 31 formed in the opposite sides of the recess 27. The rim sections, therefore, actually constitute bearing races for the anti-friction balls 30.

This arrangement thus provides for freely rotatably mounting the steering wheel rim from the hub 16 with the rim eccentric to the axis of the hub and pinion 24.

The steering wheel rim is also provided with an internal tooth ring gear 32 disposed in the bottom of the recess 27 with its teeth projecting inwardly toward the entrance to the recess. The cooperating rim sections 28 and 29 are secured together in any suitable manner such as by screws 32' passing through both of the rim sections and also through the ring gear to hold the same in fixed relationship with respect to the rim.

Referring again to Figure 2, it will be noted that the peripheral edge of the pinion which enters the recess 27 of the steering wheel rim has its teeth meshed with the teeth of the ring gear so that rotation of the rim about the bearing formed by its guide track 20 imparts rotation to the pinion 24 which in turn transmits such rotation to the steering shaft 33 inside the steering column.

In the embodiment shown a universal joint 34 is employed to connect the pinion stub shaft with the upper extremity of the steering shaft since these shafts are not coaxial. It will be readily appreciated, however, that the pinion shaft and steering shaft can be made coaxial with but slight modification without departing from the spirit of the invention.

Attention is directed to the fact that the inner periphery of the annular guide track 20 is substantially flush with the inner periphery of the steering wheel rim. It is essential that no portion of the guide track per se project outwardly of the recess in the rim where it might interfere with turning of the rim by the operator of the vehicle.

It is also important to note that in the embodiment shown the pinion rotates on a substantially horizontal axis while the axis about which the rim rotates lies at an acute angle thereto, and intersects the pinion axis a substantial distance rearwardly of the pinion. This arrangement is preferable since it enables the upper extremity of the steering column to be terminated as high up on the instrument panel as possible without changing the location of the steering wheel from its most convenient position.

With this disposition of the steering mechanism, maximum eccentricity between the steering wheel hub and rim is also obtained to assure maximum visibility through the wheel. Obviously, it requires the recess 27 to be disposed non-radially with respect to the axis of rotation of the rim, with the side walls of the recess being frusto-conical and converging toward a vertex lying on the axis of rotation of the rim substantially at the point of intersection thereof by the flat plane of the pinion 24.

The pinion and the arcuate cross member 22 are preferably covered by an escutcheon plate 35 as indicated in Figure 2 and in construction lines in Figure 3, and if desired an arcuate bar 36 may be provided for actuation of the vehicle horn. These latter members are supported from the steering wheel hub in any suitable manner and give the steering wheel an attractive finished appearance.

Referring again to Figure 2, it will be noted that the hub and the arcuate cross member 22 carried thereby constitute the only view obstructing structure interiorly of the rim of the steering wheel, and that this structure occupies but an extremely small space at the upper edge of the rim. In the absence of spokes, therefore, exceptionally clear vision of the instruments on the instrument panel is afforded the driver of the vehicle.

From the foregoing description taken in connection with the accompanying drawings, it will be readily apparent to those skilled in the art that the steering mechanism of this invention represents a substantial improvement over past mechanism for the same purpose especially since it eliminates the steering column from the driver's compartment except for the short length thereof extending between the dashboard and instrument panel and concealed from view by the instrument panel; and that it is useful not only in automotive vehicles but in aircraft, boats and the like as well.

What I claim as my invention is:

1. A steering wheel comprising: a circular rim having an annular recess therein opening to the inner periphery of the rim; a ring gear anchored in the bottom of said recess in the rim; a pinion meshing with said ring gear through said recess and adapted to be drivingly connected with a steering shaft; a mounting member by which the wheel may be attached to a stationary support; means for rotatably journalling the pinion from said mounting member; and a substantially ring shaped guide carried by said mounting member and received in said recess of the rim to act substantially as a bearing about which the rim may be rotated in effecting rotation of the steering shaft through said pinion.

2. A steering wheel as set forth in claim 1 wherein the side walls of the annular recess inwardly of the ring gear are formed to provide opposite bearing races; and ballbearing elements carried by the substantially ring shaped guide which is received in said recess for cooperation with the bearing races formed in the opposite side walls of the recess to freely rotatably support the rim on said guide.

3. A steering wheel as set forth in claim 1 including anti-friction elements in said recess reacting between the opposite side walls thereof and said ring shaped guide for freely rotatably supporting the rim on said guide.

4. A spokeless steering wheel comprising: a circular rim having an annular recess therein opening to the inner periphery of the rim; an internal ring gear anchored in the bottom of said recess in the rim; a drive pinion adapted to be operatively connected with a steering shaft to transmit rotation thereto, said drive pinion meshing with said ring gear through the recess in the steering wheel rim; a mounting member by which the wheel may be attached to a stationary support and including a hug portion at one side of the pinion having arms substantially embracing the pinion; means for rotatably journalling the pinion from said mounting member hub; and a substantially ring shaped guide fixed to said arms of the hub and received in the recess of the steering wheel rim, said guide extending completely around the inner periphery of the rim from points adjacent to the zone of engagement between the pinion and ring gear teeth and cooperating with the side walls of the recess to substantially provide a bearing about which the rim rotates so that such rotation of the rim may be transmitted to the steering shaft through said pinion, and said guide having its inner periphery substantially flush with the inner periphery of the rim so as not to interfere with manually produced rotation of the rim relative thereto.

5. A spokeless steering wheel of the character described, comprising: a stationary hub adapted to be connected at one end to a support; a pinion journalled in said hub for rotation on an axis substantially horizontal when the hub is in position on its support and axially spaced from the support engaging end of the hub, said pinion being adapted to be operatively connected with a steering shaft to impart rotation thereto; a substantially annular guide track fixed on said hub in eccentric relation to the pinion axis and tilted to a slanting position with its axis intersecting the pinion axis at the side of the pinion remote from the support engaging portion of the hub; a circular rim having means thereon defining an annular recess opening to the inner periphery of the rim to receive said guide track and a portion of the toothed periphery of the pinion, whereby said guide track acts substantially as a bearing about which the rim may be rotated in eccentric relation to said hub; and a ring gear in said recess fixed with respect to the rim and meshing with the pinion portion received in the recess to drive the pinion.

6. A spokeless steering wheel comprising: a substantially annular guide track; a rim encircling said track and guided for rotation thereon relative to the track, said guide track having a pocket formed in its outer peripheral portion; a driven member; means fixed with respect to the guide track journalling said driven member for rotation on an axis eccentric to the guide track with the driven member positioned in said pocket and lying wholly within the steering wheel rim; and means on the rim at all times engaged with the driven member to rotate the same upon rotation of the rim relative to its guide track.

7. A spokeless steering wheel comprising: a hub adapted to be secured to a stationary support; oppositely extending divergent arms on said hub; a substantially annular guide track carried by said arms in eccentric relation to the hub; a circular rim interengaged with said guide track and constrained thereby for rotation on a fixed axis eccentric to the hub; a driven member journalled in said hub between the arms thereof and adapted to be drivingly connected with a steering shaft to rotate the same, the driven member being located within the circle of the steering wheel rim and in a pocket formed in the outer peripheral portion of the guide track; and a motion transmitting connection between the steering wheel rim and said driven member by which rotation of the rim is translated into rotation of a steering shaft operatively connected with the driven member.

8. A spokeless steering wheel comprising: complementary annular members defining a steering wheel rim having a substantially annular recess opening to its inner periphery; an internal tooth ring gear disposed in the bottom of said recess; means common to said complementary rim defining members and the ring gear for securing said parts together in fixed relationship with one another; a pinion meshing with said ring gear through said recess and adapted to be drivingly connected with a steering shaft; bearing means for said pinion adapted to be secured to a stationary support; and a guide track eccentrically carried by said bearing means and engaged in the recess of the rim with substantially no portion thereof protruding from the inner periphery of the rim to act as a bearing about which the rim may be rotated in effecting rotation of the steering shaft through said pinion.

9. A spokeless steering wheel of the character described, comprising: a hub adapted to be secured to a stationary support; a pinion rotatably journalled in said hub and adapted to be operatively connected with a steering shaft to rotate the same; a substantially ring shaped guide track carried by said hub in eccentric relationship thereto and having a pocket in one peripheral portion thereof in line with the hub to receive said pinion with only the toothed edge of the pinion remote from the axis of the track projecting beyond the circular bounding surface of the track; a circular steering wheel rim formed to embrace and substantially conceal the guide track and to be guided for rotation thereon relative to the track; and means on the rim forming gear teeth meshed with said toothed edge of the pinion remote from the axis of the guide track so that rotation manually imparted to the steering wheel rim may be transmitted to the steering shaft through said pinion.

10. In an automobile: an instrument panel having a substantially upright instrument supporting surface; a steering column having its upper end portion terminating adjacent to the top of said substantially upright instrument supporting surface of the instrument panel and including a tubular housing fixed with respect to the instrument panel and a shaft rotatable in the housing to control steering; a hub mounted in fixed relationship with respect to the instrument panel and providing in effect a rearward extension of the steering column housing; a pinion journalled in said hub and operatively connected with the steering shaft; a circular steering wheel rim carried by the hub for rotation on a fixed axis relative and eccentric to said hub, said rim encircling the pinion with the upper portion of the rim adjacent to said hub substantially tangent to the adjacent periphery of the pinion; and a driving connection between the steering wheel rim and said pinion by which rotation of the steering wheel rim is translated into rotation of the steering shaft.

11. In an automobile having a windshield and an instrument panel extending downwardly therefrom: a steering column having its upper end portion terminating at the instrument panel above the lower edge thereof, said steering column including a tubular housing fixed with respect to the instrument panel and a shaft rotatable therein to control steering; a circular steering wheel rim having an annular recess therein opening to the inner periphery of the rim; a ring gear in the bottom of said recess fixed with respect to the rim; an eccentric hub for the rim fixed to the upper extremity of the steering column housing; a guide track carried by said hub and received in said recess in the rim to rotatably mount and guide the rim for rotation on an axis eccentric with respect to the hub and the steering shaft and with the upper portion of the rim substantially in line with the axis of the steering shaft; a pinion rotatably journalled in said hub and meshing with the ring gear through said recess in the steering wheel rim; and a driving connection between the pinion and the steering shaft for translating rotation of the rim relative to its guide track into rotation of the steering shaft.

JAMES D. FLORIA.

REFERENCES CITED

The following references are of record in the file of this patent:

UNITED STATES PATENTS

| Number | Name | Date |
|---|---|---|
| 145,394 | Buffington | Dec. 9, 1873 |
| 1,209,144 | Gordon | Dec. 19, 1916 |
| 1,353,427 | Seguin | Sept. 21, 1920 |
| 1,611,587 | Hawley | Dec. 21, 1926 |
| 2,167,787 | Wagner | Aug. 1, 1939 |
| 2,302,776 | Kemper | Nov. 24, 1942 |